United States Patent [19]

Huber

[11] Patent Number: 4,696,384
[45] Date of Patent: Sep. 29, 1987

[54] CLUTCH COVER ASSEMBLY AND CLUTCH INCORPORATING SAME

[75] Inventor: Alain Huber, Paris, France

[73] Assignee: Valeo, Paris, France

[21] Appl. No.: 923,040

[22] Filed: Oct. 24, 1986

[30] Foreign Application Priority Data

Oct. 28, 1985 [FR] France ............................... 85 15964

[51] Int. Cl.⁴ ............................................. F16D 13/44
[52] U.S. Cl. ................... 192/70.27; 192/89 B; 192/109 A
[58] Field of Search ............... 192/89 B, 70.28, 70.27, 192/70.23, 70.13, 99 A, 89 R, 109 A

[56] References Cited

U.S. PATENT DOCUMENTS 3,323,624  6/1967  Maurice ..................... 192/109 A X
4,291,792  9/1981  Henao ..................... 192/89

FOREIGN PATENT DOCUMENTS 1198214  8/1965  Fed. Rep. of Germany .
 853070  3/1940  France .
 953554 12/1949  France .
2096290  2/1972  France .
2311222 12/1976  France .
2441762  6/1980  France .
2546592 11/1984  France .
1357909  6/1974  United Kingdom .
2149863  6/1985  United Kingdom .

Primary Examiner—George H. Krizmanich
Attorney, Agent, or Firm—Charles E. Brown; Charles A. Brown

[57] ABSTRACT

A clutch cover assembly comprises a generally annular cover by which it is attached to a flywheel. A generally annular pressure plate is axially movable relative to the cover but constrained to rotate with it. An engagement device urges the pressure plate in the axial direction away from the cover. It is formed at least in part by an axially acting spring arrangement comprising at least two Belleville washers. These are disposed radially one inside the other with the larger diameter edge of one Belleville washer lying on a circumference of smaller diameter than the circumference on which lies the smaller diameter edge of the other Belleville washer.

16 Claims, 5 Drawing Figures

CLUTCH COVER ASSEMBLY AND CLUTCH INCORPORATING SAME

BACKGROUND OF THE INVENTION

1. Field of the invention

The present invention is generally concerned with clutches and it is more particularly directed to clutch cover assemblies, that is to say the assembly of parts which is to be attached to a reaction plate or flywheel with a friction disk inserted between the two to form a clutch, in particular a clutch for automobile vehicles.

2. Description of the Prior Art

A clutch cover assembly comprises a first generally annular part called the cover adapted to enable the assembly to be attached to a reaction plate or flywheel, a second generally annular part called the pressure plate axially movable relative to but constrained to rotate with the cover, and engagement means adapted to urge the pressure plate in the axial direction away from the cover so as to press the friction disk disposed between it and the reaction plate against the reaction plate.

The engagement means enable the clutch to be engaged and are associated with disengagement means enabling the clutch to be released. They are usually spring means.

They may be axially acting spring means comprising at least one Belleville washer, for example.

This is the case with French Pat. No. 2 441 762.

It is also the case with clutch cover assemblies using diaphragm springs, that is to say clutch cover assemblies in which a third generally annular part called the diaphragm spring has a circumferentially continuous peripheral part forming a Belleville washer and a central part subdivided by slots into radial fingers; these fingers form clutch release levers constituting the associated disengagement means and adapted to procure progressive engagement and release of the clutch.

One advantage of a diaphragm spring of this kind, quite apart from the simplicity of implementation resulting from its use, is to introduce a demultiplication effect due to the lever arm of the fingers so that, other things being equal, it is possible to reduce the force to be applied to the ends of the fingers to release the clutch.

It is to be understood that when the engagement means are also formed by axially acting spring means more than one Belleville washer may be provided, at least two, for example.

As a general rule the Belleville washers are provided with respective inside and outside edges of the same diameter as each other and, according to how they are disposed within the clutch cover assembly concerned, they operate in series or in parallel.

At present, whenever the engagement means comprise at least one Belleville washer there is always a radial offset between the circumference on which a Belleville washer is axially supported and that on which it presses on the pressure plate in order to engage the clutch.

One edge bears on the cover or some form of spacing member, in practise fixed relative to the cover, in the axial direction and either directly or indirectly, for example; its other edge acts either directly or indirectly on the pressure plate, and the radial offset between the respective bearing and supporting points therefore corresponds to the radial distance between these edges.

If in order to minimize the overall radial size of the assembly use is made of a Belleville washer having the same diameter as the pressure plate, and generally superposed on the pressure plate, and if no specific provision is made to the contrary, the force exerted by the Belleville washer on the pressure plate is applied on a circumference the diameter of which is close to that of one or the other of two circumferences delimiting the active area of the pressure plate, that is to say the part of the pressure plate through which it is adapted to bear axially on the corresponding friction facing of the associated friction disk.

An arrangement such as this inevitably leads to uneven wear of the friction facing, to the detriment of proper utilisation of the friction facing and of proper functioning of the assembly.

To alleviate this disadvantage it has been proposed to arrange for the Belleville washer to exert its force on the pressure plate on a circumference the diameter of which is substantially intermediate the diameters of the circumferences delimiting the active area of the pressure plate.

In practise the arrangement currently adopted to meet this requirement simply entails having the Belleville washer bear on the median area of the pressure plate, a like arrangement being adopted when two Belleville washers are employed in series with each other.

However, if no specific provisions are made to the contrary, this entails offsetting the Belleville washer or washers employed relative to the pressure plate in the radial direction.

If this radial offset is in the direction towards the axis of the assembly, there result difficulties with fitting the Belleville washer or washers concerned allied with an overall reduction in their size, to the detriment of the loads that they are capable of transmitting.

If, on the other hand, the radial offset is in the direction away from the axis of the assembly, the inevitable result is a general increase in the overall diameter of the assembly and an increase in the lever arm whereby the Belleville washer or washers employed bear axially against the cover, with the risk of the cover flexing.

This is why it is usually proposed to reduce the overall dimensions of the Belleville washer or washers relative to those of the pressure plate so that, although they bear axially on a median area of the pressure plate, they remain generally within its overall contour.

Although it may prove satisfactory from the point of view of the overall diameter, this compromise is nevertheless achieved to the detriment of the loads that the Belleville washer or washers employed are able to withstand.

Other things being equal, these loads depend in particular on the diameters of the circumference on which the Belleville washers bear.

A general object of the present invention is an arrangement that makes it possible to meet the requirement in relation to bearing engagement with the pressure plate without increasing the overall diameter of the assembly.

SUMMARY OF THE INVENTION

In one aspect, the present invention consists in a clutch cover assembly comprising a substantially annular cover adapted to enable the assembly to be attached to a reaction plate or flywheel, a substantially annular pressure plate axially movable relative to but constrained to rotate with the cover, and engagement means adapted to urge the pressure plate in the axial direction away from the cover and formed at least in part by axially acting spring means comprising at least two Belleville washers disposed radially one inside the other with the larger diameter periphery of one Belleville washer lying on a circumference of smaller diameter than a circumference on which lies the smaller diameter periphery of the other Belleville washer.

Using the arrangement in accordance with the present invention, the two Belleville washers employed operate in parallel on the pressure plate, independently of each other, and it thus a simple matter to ensure that the resultant of the forces they apply to the pressure plate is applied on a circumference the diameter of which is intermediate the diameters of the circumferences delimiting the active area of the pressure plate.

For example, one of the Belleville washers acts on the pressure plate along its smaller diameter periphery while the other acts on it along its larger diameter periphery.

The arrangement in accordance with the invention also has the advantage of being readily compatible, where desired, with the case where the spring engagement means employed comprise a diaphragm spring.

For example, in this case the two Belleville washers employed are disposed so as to bear axially on the cover through the intermediary of the diaphragm spring, provididing for the diaphragm spring the second bearing point in the axial direction that it requires on the side opposite the cover.

Be this as it may, by associating a diaphragm spring with the two Belleville washers in this way the advantage of demultiplying the force to be applied in order to release the clutch, as procured by the radial fingers of the diaphragm spring, is retained.

There are known arrangements in which the engagement means employed are of the fluidic type, the engagement means then comprising, for example, a variable volume pressure chamber formed between the cover and an annular flange forming a piston within the cover, this chamber being adapted to be connected to a source of pressurized fluid.

This is the case, for example, in U.S. patent application Ser. No. 872.926 filed June 11, 1986.

In a case such as this, and specifically in the case of the above-mentioned U.S. patent application, it may be beneficial to associate with the annular flange forming a piston at least one Belleville washer adapted to act in the same direction as it, the engagement means employed being at least in part formed by axially acting spring means comprising at least one Belleville washer.

The arrangement in accordance with the invention is also readily compatible, if required, with a case such as this.

To use the arrangement in accordance with the invention in this case, it is sufficient to have both the two Belleville washers employed bear on the pressure plate through the intermediary of the annular flange forming a piston.

In another aspect, the invention consists in a clutch comprising, attached to a reaction plate, a clutch cover assembly comprising a substantially annular cover adapted to enable the assembly to be attached to a reaction plate or flywheel, a substantially annular pressure plate axially movable relative to but constrained to rotate with the cover, and engagement means adapted to urge the pressure plate in the axial direction away from the cover and formed at least in part by axially acting spring means comprising at least two Belleville washers disposed radially one inside the other with the larger diameter periphery of one Belleville washer lying on a circumference of smaller diameter than a circumference on which lies the smaller diameter periphery of the other Belleville washer, and a friction disk disposed between the clutch cover assembly and the reaction plate.

The characteristics and advantages of the invention will emerge from the following description given by way of example only and with reference to the accompanying schematic drawings.

DESCRIPTION OF THE PREFERRED EMBODIMENTS

Figure 1:
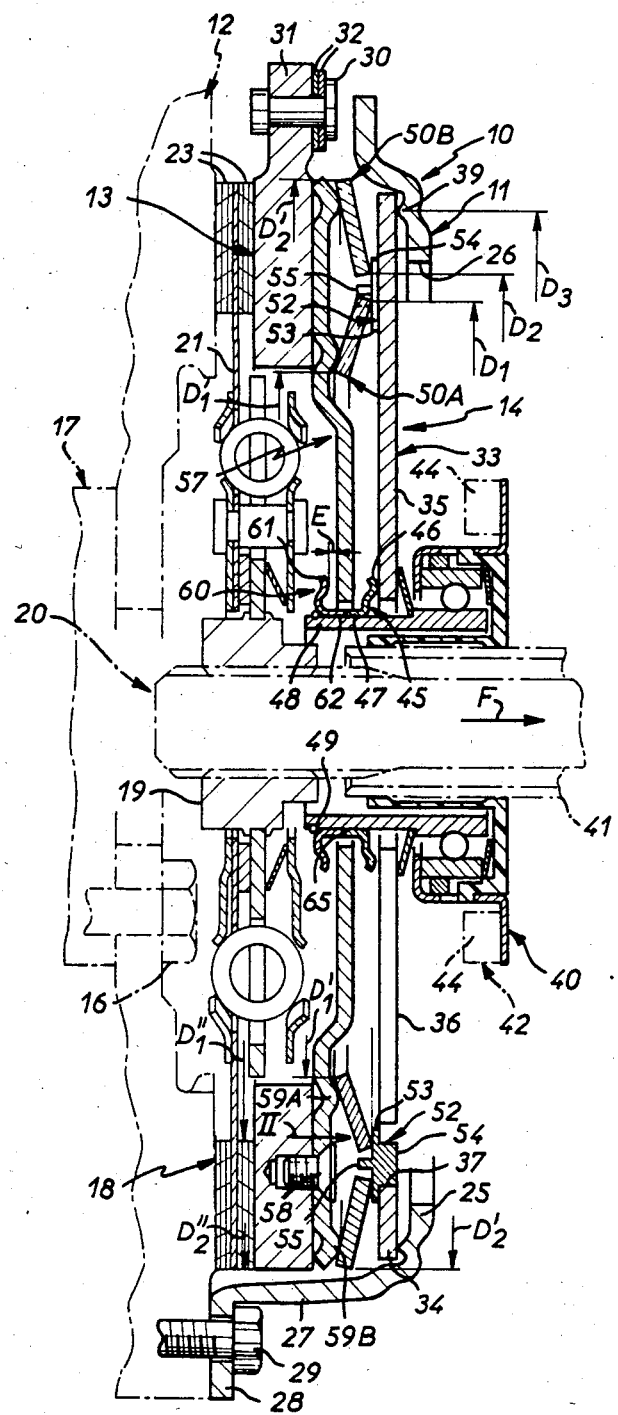
FIG. 1 is a view in axial cross-section of a clutch cover assembly in accordance with the invention shown in place on the reaction plate to which it is designed to be fitted and in the engaged configuration of the clutch that it forms with the reaction plate.
Figure 2:
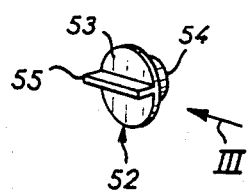
FIG. 2 is a view in perspective and from the front, as seen in the direction of the arrow II in FIG. 1, of one of the centering studs employed in this clutch cover assembly.
Figure 3:
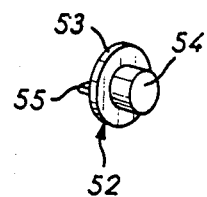
FIG. 3 is a view of the centering stud in perspective and from the back, as seen in the direction of the arrow III in FIG. 2.
Figure 4:
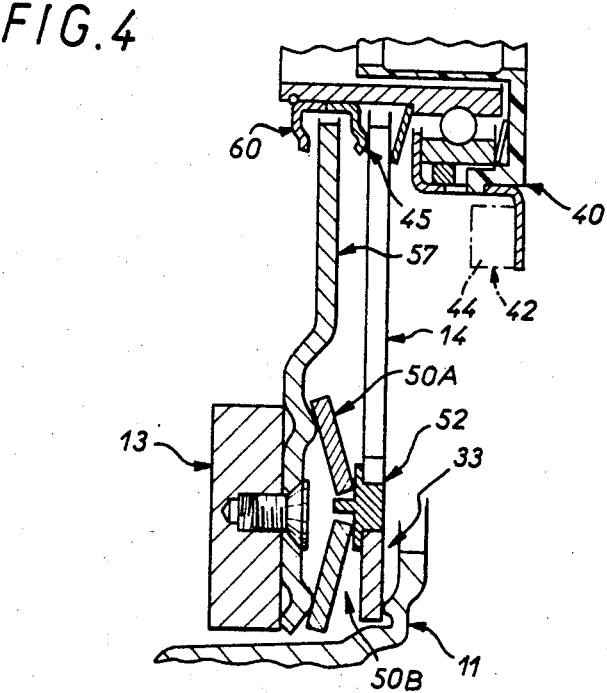
FIG. 4 is a partial view in axial cross-section repeating part of FIG. 1 to a larger scale and showing only the clutch cover assembly.

FIGS. 1 through 4 illustrate by way of example the application of the invention to a diaphragm spring equipped clutch cover assembly 10.

In the known manner, a clutch cover assembly 10 of this kind generally comprises a first generally annular part 11 called the cover which is adapted to enable the assembly to attached to a reaction plate 12 in order to form a clutch, a second generally annular part 13 called the pressure plate axially movable relative to the cover but constrained to rotate with it, and engagement means 14 adapted to urge the pressure plate 13 in the axial direction away from the cover 11.

The reaction plate 12 (or flywheel), only part of which has been schematically represented in chain-dotted line in FIG. 1, is not relevant to the present invention and, being well known in itself, will not be described in detail here.

It is adapted to be attached by screws 16 to a first shaft 17, which is in practise a driving shaft, so that is fixed axially with respect to and constrained to rotate with the shaft 17.

Likewise, the friction disk 18 to be inserted between the pressure plate 13 and the reaction plate 12 to form a cluch is represented only schematically and in chain-dotted line in FIG. 1; not being relevant to the present invention and being well known in itself, it will not be desceibed in detail here.

It comprises a hub 19 through which it is adapted to be constrained to rotate with a second shaft 20, in practise a driven shaft, and a hub plate 21 lying between the pressure plate 13 and the reaction plate 12 and carrying two generally annular fruction facings 23 at its edge, one on each side.

In a manner that is also known in itself the cover 11 of the cover assembly 10 comprises a transverse back 25, in which it is a large central opening 26, and a generally cylindrical axial skirt 27 which substantially envelopes the pressure plate 13, beyond the latter, and which has at the end opposite the back 25 a discontinuous radial rim 28 extending away from the axial of the assembly and by means of which the assembly is attached to the reaction plate 12 by screws 29.

The pressure plate 13 has on its outside periphery, that is to say its larger diameter periphery, radially projecting lugs 31 by means of which it is constrained to rotate with the cover 11 although it is able to move axially relative to the cover.

To this end elastically deformable tangs 32 disposed substantially transversely relative to the axis of the assembly and extending tangentially relative to a circumference of the assembly are fixed by one end to the lugs 31 on the pressure plate 13 by rivets 30, either singly or (as shown here) in groups, and by the other end to the cover 11, to be more precise to an area on the radial rim 28 of the latter axially offset to this end relative to the main part of the radial rim 28, the radial rim 28 being formed with spaced apertures through which pass respective lugs 31 of the pressure plate 13.

In the manner that is also known in itself, the engagement means 14 comprise a third generally annular part 33 called the diaphragm spring between the back 25 of the cover 11 and the pressure plate 13.

The diaphragm spring 33 has a circumferentially continuous peripheral part 34 which forms a Belleville washer and a central part subdivided into radial fingers 35 by slots 36 each of which originates from a hole 37 formed between two of the radial fingers 35; the radial fingers 35 of the central part form clutch release levers.

The peripheral part 34 of the diaphragm spring 33 bears axially against the cover 11, to be more precise against its back 25 which features to this end an annular bead 39; through the ends of its radial fingers 35 it is adapted to be acted upon by a clutch release bearing 40 adapted to command releasing of the clutch.

A clutch release bearing 40 of this kind not being relevant to the present invention, it will not be described here.

It is movable axially on a guide 41 which, as schematically represented in chain-dotted line in FIG. 1, surrounds the driven shaft 20 coaxially; it is acted on by a control member in the form of a clutch release yoke 42, the two fingers 44 of which are schematically represented in chain-dotted line in FIG. 1, and which moves it on the guide 41.

In the embodiment shown in FIGS. 1 through 4 the diaphragm spring 33 bears axially against the cover 11 on a circumference the diameter of which is greater than that of the circumference on which, as will be described in more detail later, the engagement means 14 as a whole are adapted to bear axially on the pressure plate 13; consequently, the clutch release bearing 40 is of the so-called "pull" type, having, in order to command releasing of the clutch, to act on the diaphragm spring 33, to be more precise on the ends of its radial fingers 35, in a direction which tends to move the diaphragm spring 33 away from the pressure plate 13, as schematically represented by the arrow F in FIG. 1.

As the corresponding provisions are well known in themselves, it will suffice to indicate that there is therefore associated with the radial fingers 35 of the diaphragm spring 33 a bearing part 45 which is adapted to bear axially on the radial fingers 35 on the side thereof facing towards the pressure plate 13 and which is adapted to be coupled in traction to the clutch release bearing 40.

This part comprises a transverse dished member 46 through which it bears axially on the radial fingers 35 of the diaphragm spring 33 and an axial bush 47 on which the clutch release bearing 40 acts.

The bush 47 of the bearing part 45 is engaged over a so-called drive member 48 forming part of the clutch release bearing 40, a ring 49 trapped in a groove in the drive member 48 being provided to secure it to the latter in the axial direction.

As these various provisions are well known in themselves they will not be described in detail hereinafter except for those necessary to understanding the invention.

In accordance with the invention, as the engagement means 14 further comprise at least two Belleville washers 50A, 50B, the two Belleville washers 50A, 50B are disposed radially inside each other, the larger diameter periphery of the one that is radially innermost, in this instance the Belleville washer 50A, lying on a circumference of diameter D1 less than that D2 of the circumference on which lies the smaller diameter periphery of the other, that is radially outermost Belleville washer, in this instance the Belleville washer 50B.

Through the smaller diameter periphery in the case of one of them and through the larger diameter periphery in the case of the other of them the Belleville washers 50A, 50B employed bear axially on one of the two generally annular parts, that is the cover 11 and the pressure plate 13; through the larger diameter periphery in the case of one of them and through the smaller diameter periphery in the case of the other of them, they both bear axially on the other of the two generally annular parts.

The Belleville washers 50A, 50B bear axially on the cover 11 indirectly, through the intermediary of the diaphragm spring 33, so providing a second point of axial support for the diaphragm spring 33 on the side opposite the cover 11 on which, as previously mentioned, is a first point of support on a circumference of diameter D3. In alternative embodiments the Belleville washers could bear directly on the cover.

It follows from what has already been stated that the diameter D3, which is that of the annular bead 39 on the back 25 of the cover 11 for the circumferentially continuous part of the diaphragm 33 forming a Belleville washer to bear on in the axial direction, is greater than the two diameters D1, D2.

It is through their peripheries that are near each other in the radial direction, namely the larger diameter periphery in the case of the Belleville washer 50A and the smaller diameter periphery in the case of the Belleville washer 50B, that the two Belleville washers 50A, 50B bear on the cover 11 through the intermediary of the diaphragm spring 33.

Centering means are provided between the two Belleville washers 50A, 50B and at least one of the two generally annular parts 11, 13 between which they are operative; these centering means are appropriately centered relative to the generally annular part and comprise axially projecting keying means between the Belleville washers.

These centering means are associated with the diaphragm spring 33 and comprise separate studs 52.

Each stud 52 comprises a plate 53 through which it is adapted to bear axially on the diaphragm spring 33, on the side thereof facing towards the pressure plate 13, and projecting from a first side of the plate 33 a termination 54 by means of which it is inserted into one of the holes 37 in the diaphragm spring 33.

On the other side of the plate 53 each stud 52 has a rib 55 projecting axially and substantially aligned with a diameter of the plate 53.

The ribs 55 lie radially between the Belleville washers 50A, 50B, to which they are substantially tangential; together they form the keying means provided for centering the Belleville washers 50A, 50B.

For reasons that will emerge hereinafter, the pressure plate 13 is fastened to a substantially transverse annular drive flange 57 on the side of the pressure plate facing towards the cover 11; it is through the intermediary of this annular drive flange 57 that the two Belleville washers 50A, 50B both bear on the pressure plate 13.

The annular drive flange 57 is attached to the pressure plate 13 by screws 58.

It forms two annular beads 59A, 59B for the Belleville washers 50A, 50B to bear on; the diameter of the former is less than the diameter D1 and close to that D'1 of the smaller diameter periphery of the Belleville washer 50A and the diameter of the latter is greater than the diameter D2 and close to that D'2 of the larger diameter periphery of the Belleville washer 50B.

The diameters D"1, D"2 of the circumferences delimiting the active area of the pressure plate 13 through which it is adapted to bear axially on the corresponding friction facing 23 of the friction disk 18 are respectively close to the diameters D'1, D'2.

Like the diaphragm spring 33, the annular drive flange 57 of the pressure plate 13 extends radially towards the axis of the assembly, to a point in line with the ends of the radial fingers 35 of the diaphragm spring 33, and there is associated with it a bearing part 60 adapted to bear axially on the side of the annular drive flange 57 facing towards the pressure plate 13 and also adapted to be coupled in traction to the clutch release bearing 40.

Like the bearing part 45 associated with the diaphragm spring 33, the bearing part 60 features a radial dished member 61 through which it is adapted to bear on the annular drive flange 57 and an axial bush 62 engaged over the drive member 48 of the clutch release bearing 40.

The bushes 47, 62 of the bearing parts 45, 60 are oriented in opposite axial directions relative to each other and therefore adapted to abut against each other at their edges.

The bush 47 of the bearing part 45 is oriented axially towards the pressure plate 13 and the bush 62 of the bearing part 60 is oriented axially towards the diaphragm spring 33, the bushes 47, 62 being directed towards each other by virtue of the central opening 65 in the annular drive flange 57.

The ring 49 is interlocked with the bearing part 60 for axially securing the whole to the drive member 48 of the clutch release bearing 40.

In the engaged configuration of the clutch concerned as shown here there is a clearance E between the annular drive flange 57 of the pressure plate 13 and the dished member 61 of the bearing part 60 adapted to bear axially against the latter.

When, in order to command the releasing of the clutch, the clutch release bearing 40 is moved axially by the associated control member 42 in the direction away from the pressure plate 13 as shown by the arrow F in FIG. 1, initially only the diaphragm spring 33 is loaded by the bearing part 45, commensurately offloading the Belleville washers 50A, 50B, and as the axial movement of the clutch release bearing 40 continues the clearance E between the bearing part 60 and the annular drive flange 57 of the pressure plate 13 is absorbed.

During a second stage, with the parts in question thus in contact with each other, the pressure plate 13 is entrained by the clutch release bearing 40 and moved away from the friction disk 18.

The clutch is then released.

When the action of the control member 42 on the clutch release bearing 40 is terminated, the diaphragm spring 33 and the Belleville washers 50A, 50B return to their initial configuration with the result that the friction disk 18 is again clamped by the pressure plate 13 and the clutch is thus engaged.

The Belleville washers 50A, 50B are designed so that the resultant of the forces they apply to the pressure plate 13 is applied on a circumference the mean diameter of which lies between the diameters D"1, D"2 delimiting the active area of the pressure plate 13, as defined above.

An arrangement of this kind advantageously favors even wear of the friction facings 23 on the friction disk 18.

The force exerted by a Belleville washer depends on the diameter of the circumferences against which it bears, its thickness, the material from which it is made and its cone angle when unstressed; the Belleville washers 50A, 50B may be designed so that the circumference on which the resultant of the forces they apply to the pressure plate 13 lies is where required.

For the resultant of the forces they apply to the pressure plate 13 to be applied on a circumference the mean diameter of which lies between the diameters D'1, D'2 of the active area of the pressure plate, for example, it is merely necessary to choose appropriately the diameter of the circumferences on which they bear.

Figure 5:
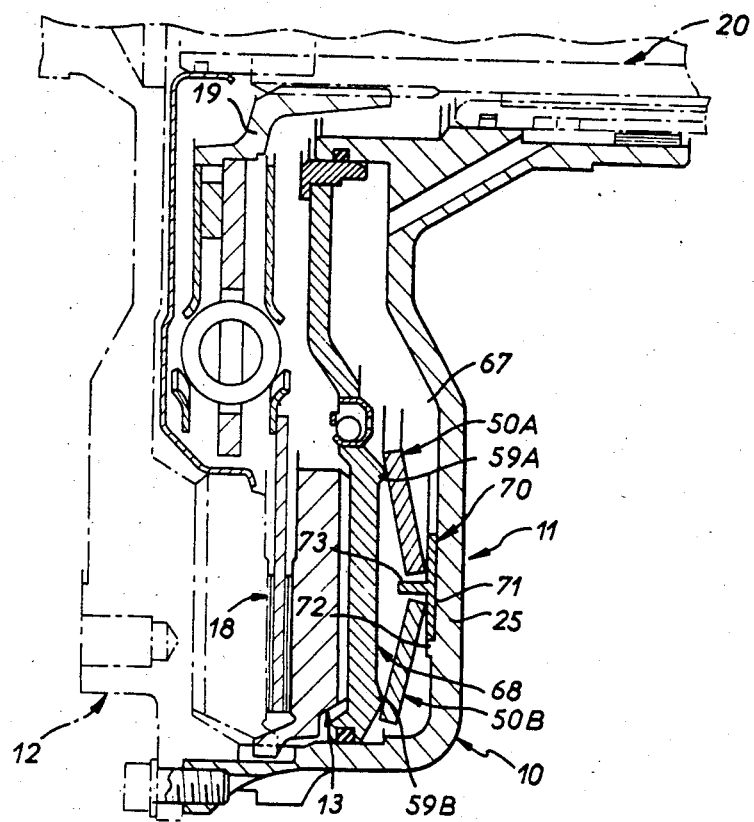
FIG. 5 is a partial view in axial cross-section analogous to that of FIG. 1, but to the same scale as FIG. 2 and relating to a different type of clutch.

The embodiment shown in FIG. 5 concerns the application of the invention to the case where, as described in detail in the aforementioned U.S. patent application Ser. No. 872,926, the engagement means 14 comprise a variable volume pressure chamber 67 formed between the cover 11 and an annular flange 68 forming a piston within the cover 11, this chamber being adapted to be connected to a source of pressurized fluid.

As the corresponding provisions are described in detail in U.S. patent application Ser. No. 872,926, they will not be described again here.

As two Belleville washers 50A, 50B are associated wtih the annular flange 68 forming a piston and thus constitute the corresponding engagement means 14, both the Belleville washers 50A, 50B bear on the pressure plate 13 through the intermediary of the annular flange 68 forming the piston.

To this end the latter features feature two annular beads 59A, 59B.

As previously, it is through its smaller diameter periphery that the radially innermost Belleville washer 50A bears axially on the annular flange 68 forming the piston, the radially outermost Belleville washer 50B bearing on the latter through its larger diameter periphery.

The Belleville washers 50A, 50B bear axially on the cover 11, to be more precise on its back 25, and between them and the back 25 are disposed centering means in the form of a circumferentially continuous ring 70.

This ring 70 comprises a generally transverse baseplate 71 which is centered by its larger diameter periphery on an axially projecting rib 72 provided for this purpose on the inside surface of the back 25 of the cover 11.

The ring forming the centering means in question features an axially projecting rib 73 which is inserted between the Belleville washers 50A, 50B to center them.

It is to be understood that the present invention is not limited to the embodiments and applications shown and described, but encompasses any variant execution thereof.

Specifically, when the pressure plate is fastened to an annular drive flange as specifically described and shown here, an insulative layer may be provided, if required, between the pressure plate and the annular drive flange.

There is claimed:

1. Clutch cover assembly comprising a substantially annular cover adapted to enable said assembly to be attached to a reaction plate or flywheel, a substantially annular pressure plate axially movable relative to but constrained to rotate with said cover, and engagement means adapted to urge said pressure plate in the axial direction away from said cover and formed at least in part by axially acting spring means comprising at least two Belleville washers disposed radially one inside the other with the larger diameter periphery of one Belleville washer lying on a circumference of smaller diameter than a circumference on which lies the smaller diameter periphery of the other Belleville washer.

2. Clutch cover assembly according to claim 1, wherein the smaller diameter periphery of one Belleville washer and the larger diameter periphery of the other Belleville washer respectively bear in the axial direction and either directly or indirectly on one of a pair of members comprising said cover and said pressure plate and the larger diameter periphery of one Belleville washer and the smaller diameter periphery of the other Belleville washer respectively bear in the axial direction and either directly or indirectly on the other of said pair of members comprising said cover and said presssure plate.

3. Clutch cover assembly according to claim 2, further comprising, between said Belleville washers and at least one member of said pair of members comprising said cover and said pressure plate, centering means centered relative to said at least one member and comprising axially projecting keying means between said Belleville washers.

4. Clutch cover assembly according to claim 3, wherein said centering means comprise individual studs.

5. Clutch cover assembly according to claim 3, wherein said centering means comprise a ring which is substantially continuous in the circumferential direction.

6. Clutch cover assembly according to claim 1, wherein said engagement means comprise a substantially annular diaphragm spring having a circumferentially continuous outer part forming a Belleville washer and a central part subdivided by slots into radial fingers, each of said slots originating from a hole formed between two of said radial fingers, said peripheral part bearing axially on said cover and said two Belleville washers bearing axially on said cover through the intermediary of said diaphragm spring, for which they thereby constitute a second means of axial support.

7. Clutch cover assembly according to claim 6, wherein the larger diameter periphery of one of said two Belleville washers and the smaller diameter periphery of the other of said two Belleville washers bear on said cover through the intermediary of said diaphragm spring.

8. Clutch cover assembly according to claim 7, wherein said centering means comprise individual studs and said studs each comprise a termination through the intermediary of which it is individually inserted in a respective hole in said diaphragm spring.

9. Clutch cover assembly according to claim 6, further comprising a first bearing part associated with said radial fingers of said diaphragm spring and adapted to bear axially on the side of said radial fingers facing towards said pressure plate and to be coupled in traction to a clutch release bearing, an annular drive flange fastened to said pressure plate, and a second bearing part associated with said annular drive flange and adapted to bear axially on the side of said annular drive flange facing towards said pressure plate and to be coupled in traction to said clutch release bearing.

10. Clutch cover assembly according to claim 9, wherein each drive part comprises an axial bush and said bushes are oriented in respective opposite axial directions and adapted to abut against each other through their respective edges.

11. Clutch cover assembly according to claim 9, wherein each Belleville washer bears on said pressure plate through the intermediary of its respective annular drive flange.

12. Clutch cover assembly according to claim 1, further comprising an annular flange forming a piston inside said cover and wherein said engagement means comprise a variable volume pressure chamber formed between said cover and said annular flange, said at least two Belleville washers both bearing on said pressure plate through the intermediary of said annular flange.

13. Clutch cover assembly according to claim 1, wherein said Belleville washers are adapted to exert a resultant force on said pressure plate on a circumference the diameter of which is intermediate those of circumferences delimiting an active part of said pressure plate through which it is adapted to bear axially on a friction disk.

14. Clutch comprising, attached to a reaction plate a clutch cover assembly comprising a substantially annular cover adapted to enable said assembly to be attached to a reaction plate or flywheel, a substantially annular pressure plate axially movable relative to but constrained to rotate with said cover, and engagement means adapted to urge said pressure plate in the axial direction away from said cover and formed at least in part by axially acting spring means comprising at least two Belleville washers disposed radially on inside the other with the larger diameter periphery of one Belleville washer lying on a circumference of smaller diameter than a circumference on which lies the smaller diameter periphery of the other Belleville washer, and a friction disk disposed between said clutch cover assembly and said reaction plate.

15. Clutch according to claim 14, adapted to be released in two stages: a first stage during which said Belleville washers of said clutch cover assembly are off-loaded and a second stage during which said pressure plate is moved away from said friction disk.

16. Clutch according to claim 15, further comprising a first bearing part associated with said radial fingers of said diaphragm spring and adapted to bear axially on the side of said radial fingers facing towards said pressure plate and to be coupled in traction to a clutch release bearing, an annular drive flange fastened to said pressure plate, and a second bearing part associated with said annular drive flange facing towards said pressure plate and adapted to be coupled in traction to said clutch release bearing, wherein in an engaged configuration of the clutch clearance is provided between said annular drive flange of said pressure plate and said bearing part adapted to bear axially on said pressure plate.

* * * * *